July 19, 1955
J. L. BILLS
2,713,601
PRODUCTION OF ACETYLENE
Filed July 28, 1951
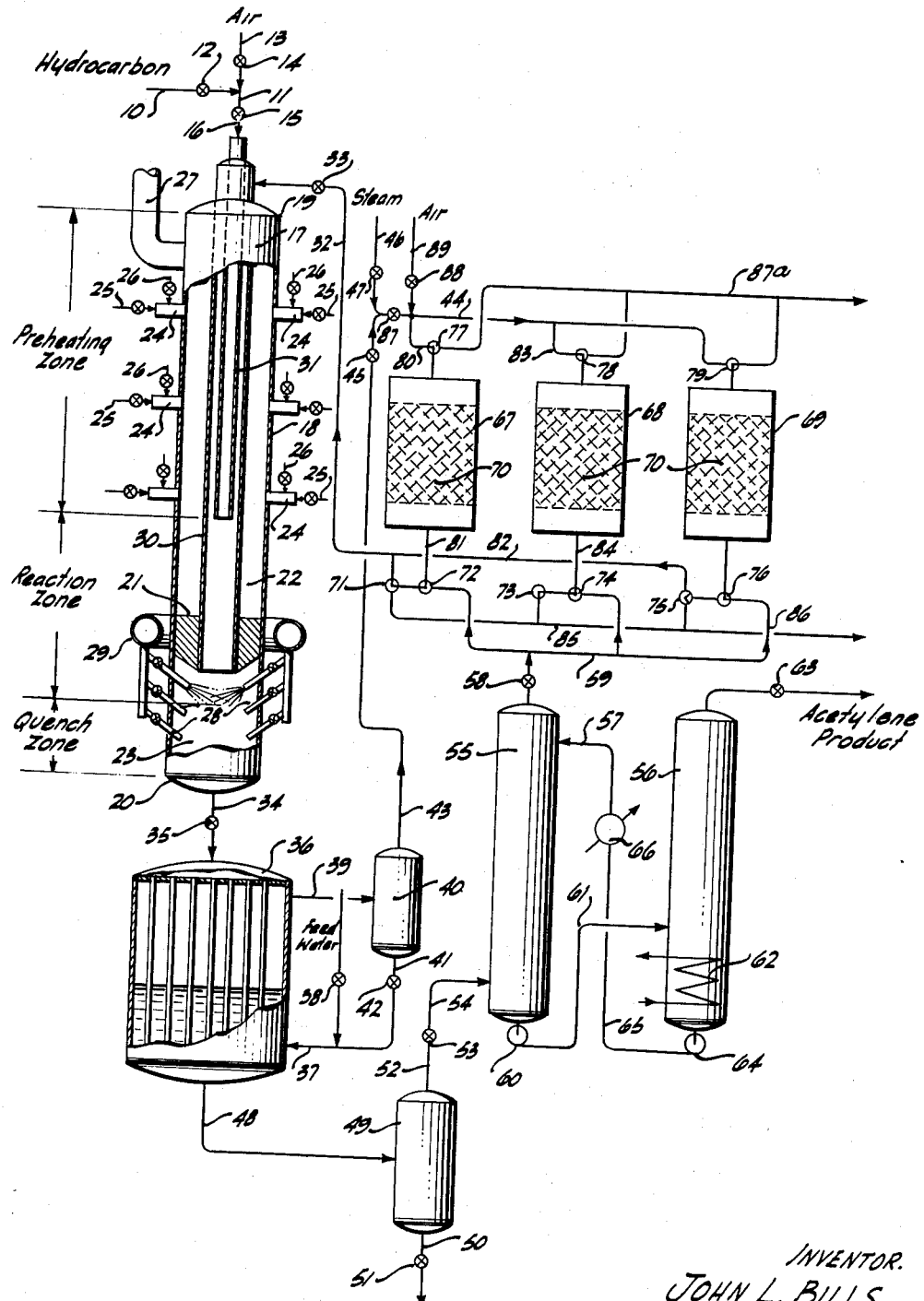
INVENTOR.
JOHN L. BILLS,
BY Richard C. Horton
ATTORNEY.

United States Patent Office 2,713,601
Patented July 19, 1955

2,713,601

PRODUCTION OF ACETYLENE

John L. Bills, Long Beach, Calif., assignor to Union Oil Company of California, Los Angeles, Calif., a corporation of California Application July 28, 1951, Serial No. 239,070

13 Claims. (Cl. 260—679)

This invention relates to the production of acetylene, and in particular concerns a process wherein a hydrocarbon gas or vapor is reacted with oxygen in the presence of hydrogen to produce a hydrogen- and acetylene-containing effluent gas which is treated to recover the acetylene and thereafter employed to produce hydrogen for use in the process.

It is known that acetylene may be produced by the partial oxidation of hydrocarbons, particularly saturated lower aliphatic hydrocarbons such as methane, ethane, propane, natural gas, etc., employing substantially pure oxygen as the oxidizing agent. The reaction is effected in the vapor phase at relatively high temperatures, e. g., above 1000° C., over short periods of time. However, in spite of the fact that acetylene yields as high as 40 per cent of theoretical based on the hydrocarbon consumed may be obtained, acetylene processes employing this reaction have not proved commercially practical in this country by reason of the high cost of the substantially pure oxygen required. When it is attempted to operate such processes with air instead of oxygen the acetylene yield is greatly reduced and, more importantly, large quantities of carbon black are formed within the reactor, thereby giving rise to serious mechanical difficulties. Also, thermal requirements are much higher since four parts of inert nitrogen must be heated to the high reaction temperature for every part of oxygen employed, and higher temperatures are required to promote the reaction because of the low partial pressure of the oxygen reactant.

It is accordingly an object of the present invention to provide an improved process for the production of acetylene by the partial oxidation of hydrocarbons.

Another object is to provide a process whereby acetylene may be produced from hydrocarbons in yields higher than those attained heretofore.

A further object is to provide a process whereby hydrocarbons, particularly normally gaseous saturated aliphatic hydrocarbons, are caused to react with air to form acetylene in yields as good as or better than those heretofore realized in processes employing pure oxygen as the oxidizing agent.

Other objects will be apparent from the following detailed description of the invention, and various advantages not specifically referred to herein will occur to those skilled in the art upon employment of the invention in practice.

I have now found that the above and related objects may be realized in a process based on the discovery that a highly exothermic reaction between hydrocarbons and oxygen to produce acetylene may be induced by admixing hydrogen with a suitably preheated reactant gas mixture comprising the hydrocarbon and oxygen, and that by limiting the period of time over which such reaction is allowed to take place the acetylene may be obtained in relatively high yield, e. g., 40–50 per cent of theoretical based on the amount of hydrocarbon consumed, even when the oxygen is provided in the form of air. Carbon formation is substantially nil, and highly efficient tubular reactors may be employed without becoming clogged. The reaction induced by addition of hydrogen to the preheated reactant gas mixture is more highly exothermic than that involved in the previously known processes, and accordingly the heat requirements of the present reaction are lower. Substantially the only heat consumed is that required to preheat the reactant gas, and by employing specially designed reactors, as hereinafter more fully described, the hot product gas may be used to preheat the reactant gas so that the reaction can be effected autothermically, i. e., without the consumption of substantial amounts of heat supplied from outside sources.

I am aware that it has been proposed to employ hydrogen as an inert diluent in admixture with hydrocarbons in hydrocarbon cracking processes carried out to produce acetylene. In the present process, however, the hydrogen does not function as an inert diluent, nor does it serve to improve the yield of acetylene when admixed with the reactant gas prior to preheating. The fact that the added hydrogen in the present process actually enters into the acetylene producing reaction and does not serve merely as an inert diluent is established by the fact that upon admixing a stream of hydrogen which has been preheated to a temperature of about 1025° C. with a similarly preheated stream comprising about 23 volume per cent of natural gas and about 77 volume per cent of air, the temperature of the mixture spontaneously increases to about 1175° C. and acetylene is produced in a yield of about 47 per cent of theoretical based on the amount of natural gas consumed. If nitrogen be substituted for the hydrogen no appreciable increase in temperature takes place and very little acetylene is formed. Similariy, substantially no acetylene is formed when the mixture of natural gas and air is simply heated to about 1025° C. Also, if the hydrogen be admixed with the mixture of natural gas and air prior to heating to about 1025° C., substantially no acetylene is formed nor is there any sudden increase in temperature.

While it is thus apparent that the hydrogen enters into the acetylene-producing reaction, or at least serves to induce or initiate an acetylene-producing reaction, when added to the pre-heated reactant gas as herein described, it is characteristic of the reaction that there is no net consumption of hydrogen. In fact, under normal operating conditions there is a net production of hydrogen, i. e., the product gas contains a greater amount of hydrogen than was employed in initiating the reaction. A typical product gas obtained from a reactant gas mixture consisting of methane and air comprises on a water-free basis:

| | Volume percent |
|---|---|
| Acetylene | 3.6 |
| Methane | 5.0 |
| Ethylene | 0.4 |
| Carbon monoxide | 5.7 |
| Carbon dioxide | 0.5 |
| Nitrogen | 42.8 |
| Hydrogen | 42.0 |
| | 100.0 |

In order to adapt the above-described method for forming acetylene to commercially feasible operation it is essential that the hydrogen be recovered from the product gas and re-employed to initiate the acetylene-producing reaction. I have found that in effect this may be accomplished in a highly economical manner by operating the acetylene-producing reaction in cooperation with the so-called "steam-iron" reaction for the production of hydrogen. More particularly, I have found that the gas produced by the acetylene reaction, after separation of the acetylene therefrom, is highly satisfactory for use as the reducing or regeneration gas in the cyclic steam-iron process wherein steam is passed over iron or a lower oxide of iron (FeO) to form hydrogen and a higher iron oxide (Fe₃O₄) and the latter is subsequently treated with a gas to reduce it back to the lower oxide for further treatment with steam to form more hydrogen. Also, the sensible heat of the acetylene-containing product gas may be employed to produce the steam required by the hydrogen-producing reaction. Thus, the acetylene-producing operation furnishes steam and reducing gas for use in the hydrogen-producing operation and the latter furnishes hydrogen for use in the acetylene-producing operation, and the two operations are mutually assistive and cooperative to form an integrated process possessing a number of operational and economic advantages.

The process of the invention and its manner of operation will readily be apparent by reference to the single figure of the accompanying drawing which forms a part of this specification and which represents a schematic flow diagram of a process embodying the principle of the invention.

Referring now to the drawing, a hydrocarbon gas or vapor such as methane or natural gas is introduced into line 10 and passes into feed conduit 11 at a rate controlled by valve 12. Simultaneously, an oxygen-containing gas such as air is introduced into line 13 and passes into feed conduit 11 at a rate controlled by valve 14. The gas mixture within conduit 11 constitutes the reactant gas, and passes via valve 15 and line 16 into acetylene reactor 17.

Reactor 17 comprises an elongated vessel having cylindrical side-walls 18 and upper and lower end closures 19 and 20, respectively. The vessel is lined with refractory brick or other material, not shown, which is capable of withstanding temperatures of the order of 1600° C. and is preferably surrounded by thermal insulation, not shown, to reduce heat losses to the atmosphere. An internally disposed partition or plug 21 divides the reactor into an upper furnace compartment 22 and a lower quenching compartment 23. Burners 24, provided by fuel and air supply lines 25 and 26, respectively, fire into furnace compartment 22. Stack 27 communicates with furnace compartment 22, and serves for the withdrawal of the flue gases produced by burners 24. Spray nozzles 28 are arranged to inject a liquid cooling medium, e. g., water, supplied from manifold 29 into quenching compartment 23 at selected points along the length thereof. Within reactor 17, a centrally disposed outer tube 30 extends through furnace compartment 22 and communicates between quenching compartment 23 and the exterior. Outer tube 30 is closed at its exterior end to receive coaxially positioned inner tube 31 which extends within outer tube 30 to a point within furnace compartment 22. Inlet means are provided for introducing gases into inner tube 31 and into the annular space between inner tube 31 and outer tube 30, and outlet means are provided for withdrawing gas from quenching compartment 23.

The reactant gas mixture is introduced into inner tube 31 from line 16, and is preheated to a moderately high temperature, e. g., 600° C. or above, during its passage therethrough, heat being supplied by burners 24. Simultaneously, a stream of hydrogen is introduced into the annular space between inner tube 31 and outer tube 30 from line 32 at a rate controlled by valve 33. The hydrogen passes downwardly through said annular space and is therein preheated to the aforesaid moderately high temperature. At the terminus of inner tube 31 within outer tube 30 the preheated reactant gas and hydrogen become mixed and the acetylene-producing reaction occurs. Those portions of tubes 30 and 31 which are co-extensive within furnace compartment 22 thus constitute preheating zones for the hydrogen and reactant gas, respectively.

The acetylene-producing reaction takes place as the gases pass through that portion of tube 30 which extends beyond tube 31, and is terminated when the gases are quenched within quenching compartment 23 by the liquid quenching medium introduced through nozzles 28. The reaction zone thus extends, as shown, from the inner terminus of tube 31 to the point where the reacting gases are quenched. The time of passage of the gases through this zone, i. e. the reaction time, may be varied by suitably controlling the flow rate of the gases through the reactor, and/or by varying the point at which the gases are quenched by suitably selecting an upper or lower set of spray nozzles 28.

The quenched product gas is withdrawn from reactor 17 through line 34 at a rate controlled by valve 35, and is passed to a waste heat boiler 36 wherein the sensible heat of the quenched product gas is employed to produce steam which is employed in the subsequent hydrogen-producing operation. In order to conserve the heat content of the product gas, which is produced at a temperature of 1100°–1500° C., the quantity of quenching liquid supplied to quenching compartment 23 is preferably limited to the amount required merely to terminate the reaction. Preferably, the product gas is withdrawn from the reactor at a temperature of about 500°–600° C. so that the quenched product gas which is introduced into waste heat boiler 36 will have sufficient sensible heat to generate at least a substantial part of the steam required in the subsequent hydrogen-producing operation. Waste heat boiler 36 is shown as being of the tube-and-shell type, with the hot product gas passing through the tubes. Feed water is introduced into boiler 36 from line 37 at a rate controlled by valve 38. Steam is withdrawn from boiler 36 by means of line 39, and is passed to condensate separator 40 wherein condensate water is separated and returned to the boiler via lines 41 and 37 at a rate controlled by valve 42. The steam is withdrawn from separator 40 through line 43 and is passed to manifold 44 associated with the hydrogen-producing operation at a rate controlled by valve 45. Line 46 and valve 47 are provided for the introduction into manifold 44 of whatever steam might be required by the hydrogen-producing operation over and above that supplied from the waste heat boiler.

The product gas which passes through the tubes of waste heat boiler 39 is cooled therein, and a considerable quantity of vaporized quenching fluid is condensed. The mixture of product gas and condensed quenching fluid is withdrawn from boiler 36 through line 48, and passes to separator 49 wherein the condensed quenching fluid is separated and drawn off through line 50 at a rate controlled by valve 51. The product gas is withdrawn from separator 49 through line 52 at a rate controlled by valve 53 and is passed to an acetylene recovery system through line 54.

The acetylene recovery system shown is of the solvent extraction type comprising an absorption tower 55 and a rectification tower 56. The acetylene-containing product gas is introduced into the bottom of absorption tower 55 from line 54 at a rate controlled by valve 53. Within tower 55 the gas rises countercurrently to a descending stream of absorbent introduced into the top of tower 55 from line 57. The non-absorbed gas is withdrawn from the top of tower 55 at a rate controlled by valve 58, and is passed to manifold 59 associated with the hydrogen-producing operation. The rich absorbent is withdrawn from the bottom of absorption tower 55 and is passed by means of pump 60 and line 61 to rectification tower 56. The latter is provided with internal heating means, such as a steam coil 62, whereby the rich absorbent is heated to drive off the dissolved acetylene. The latter is withdrawn from tower 56 at a rate controlled by valve 63 and is passed to storage means, not shown. Lean absorbent is withdrawn from the bottom of tower 56 and is passed by means of pump 64 and line 65 to a cooler 66, and is thence returned to absorption tower 55 via line 57.

The hydrogen-producing operation is shown as being carried out in three identical reactors 67, 68 and 69, each of which is filled with a mass of porous iron or iron ore 70. The operation comprises a make cycle, wherein steam is passed over an iron or lower iron oxide mass to form hydrogen and a higher iron oxide; a regeneration cycle, wherein the acetylene-free product gas withdrawn from the acetylene recovery system is passed over the higher iron oxide to reduce the latter to iron or a lower iron oxide; and a purge cycle, wherein the reduced iron or lower iron oxide is treated with steam for a short period of time to remove impurities. The particular cycle being effected in each reactor is determined by the setting of valves 71 to 79, inclusive. Reactor 67 is shown operating on the make cycle. Steam from manifold 44 passes via line 80 and valve 77 down through the iron or lower iron oxide mass 70 contained in reactor 67, and the hydrogen which is thereby produced passes via line 81 and valves 72 and 71 into hydrogen manifold 82 which communicates with hydrogen supply line 32 of reactor 17. Simultaneously, steam from manifold 44 passes via line 83 and valve 78 down through the iron or lower iron oxide mass 70 contained in reactor 68 which is operating on the purge cycle. The gas produced in reactor 68 is withdrawn through line 84 and is passed via valves 74 and 73 into manifold 85 and is discarded. Reactor 69 is shown operating on the regeneration cycle. The acetylene-free product gas in manifold 59 is passed into reactor 69 through line 86 and valve 76, valve 75 being closed, and passes upwardly through the higher iron oxide mass 70 contained in reactor 69. The mass is thereby reduced to iron or a lower oxide of iron, and the spent gas is withdrawn from reactor 69 and discarded through valve 79 and manifold 87a. In some instances it may be desirable to subject the mass 70 to a short period of air blowing following the make cycle. In such case, valve 87 is closed and valve 88 in air supply line 89 is opened. Air is introduced into line 89 and is passed via manifold 44 and one of valves 77, 78 or 79 to the appropriate reactor. The spent air is discharged into manifold 85 by suitably positioning valves 71 to 76. Operating details of the hydrogen-producing operation are more fully set forth hereinafter.

It will be seen that the process of the invention comprises four essential operations which mutually cooperate in producing substantially pure acetylene in a highly advantageous and economical manner: (1) a reaction step wherein a hydrocarbon, oxygen (or air) and hydrogen are employed to produce a hot product gas comprising acetylene and hydrogen; (2) a steam generation step wherein the sensible heat of the hot product gas is employed to produce steam; (3) an acetylene separation step wherein the acetylene is separated from the hydrogen and other components of the product gas; and (4) a hydrogen-producing step in which the steam produced in step (2) and the acetylene-free hydrogen-containing gas produced in step (3) are employed in the production of the hydrogen required by step (1). Each of these steps is described in detail below:

THE REACTION STEP

The reaction step consists essentially in (1) preheating a reactant gas comprising a hydrocarbon gas or vapor and oxygen in the substantial absence of free hydrogen to a moderately high temperature such that upon admixing of the preheated reactant gas with hydrogen there ensues an exothermic acetylene-producing reaction in which a temperature of 1100°–1500° C. is attained, (2) admixing the preheated reactant gas with hydrogen whereby said reaction occurs and said high temperature is attained, and (3) within 0.001–0.05 second after admixture of the reactant gas and hydrogen cooling the hot product gas to a temperature at which substantially no further reaction occurs.

A wide variety of hydrocarbon reactants may be employed, but best results are obtained with non-aromatic hydrocarbons, particularly those which are normally gaseous or liquid and boil below about 400° C. under atmospheric pressure. The term "non-aromatic hydrocarbon" is herein employed as a generic term including saturated and unsaturated aliphatic and cycloaliphatic hydrocarbons but excluding aromatic or benzenoid hydrocarbons. The normally gaseous saturated aliphatic hydrocarbons, particularly methane and natural gas, are especially preferred by reason of their low cost, ease of handling and high conversion to acetylene. Hydrocarbon mixtures, e. g., mixed refinery gases and various petroleum distillates, are also suitable. When employing a liquid hydrocarbon reactant, it is preferably vaporized prior to its admixture with the oxygen and/or prior to being preheated, although such vaporization may be effected as a part of the preheating step. The oxygen reactant may be pure oxygen itself, oxygen-enriched air, ordinary air, or any other gas containing free oxygen. Air is preferred by reason of its lack of cost, and it is one of the features of the process that the results obtained employing air are comparable or better than those of previous processes in which pure oxygen has been employed. The mole ratio of hydrocarbon to oxygen in the reactant gas varies between rather wide limits depending upon the identity of the hydrocarbon component. When the hydrocarbon is one of relatively high molecular weight, e. g., a petroleum distillate such as kerosene, as many as 50 moles of oxygen should be provided per mole of hydrocarbon. On the other hand, when the hydrocarbon is a normally gaseous saturated aliphatic hydrocarbon, e. g., methane, natural gas, ethane, etc., an excess of the hydrocarbon is employed so that the mole ratio of hydrocarbon to oxygen is suitably between about 1.33/1 and about 2.0/1. Thus, the mole ratio of hydrocarbon to oxygen varies from about 0.02/1 to about 2.0/1 depending upon the nature of the hydrocarbon. When the oxygen reactant is in the form of air and the hydrocarbon is methane or natural gas, the reactant gas preferably comprises between about 17 and about 30 per cent by volume of the hydrocarbon and, correspondingly, between about 83 and about 70 per cent by volume of air. When the reactant gas comprises air and a petroleum distillate such as kerosene, it may contain between about 4 and about 10 per cent by volume of the hydrocarbon vapor and between about 96 and about 90 per cent by volume of air.

The hydrogen which is admixed with the preheated reactant gas to initiate or induce the acetylene-producing reaction may be pure hydrogen or in the form of a mixture of free hydrogen and an inert gas which does not react with the other components of the system under the conditions existing during the reaction, e. g., nitrogen, carbon monoxide, carbon dioxide, water vapor, etc. The concentration of free hydrogen in admixture with the inert gas may be as low as 30 volume per cent, but is preferably at least about 85 volume per cent. The term "hydrogen-containing gas" is herein employed to refer to such a gas comprising from about 30 to 100 per cent of free hydrogen and from about 70 to zero per cent of inert components. Since the hydrogen-producing operation is very readily carried out so as to produce hydrogen of 98 per cent or higher purity, the hydrogen-containing gas will usually comprise substantially pure hydrogen.

Preferably, but not necessarily, the hydrogen-containing gas is preheated to substantially the same temperature as the preheated reactant gas prior to being admixed therewith. The heating means employed may be the same as those provided for preheating the reactant gas, as is shown in reactor 17 in the accompanying drawing, or they may be independent. The amount of hydrogen-containing gas employed may be varied considerably. Usually, however, from about 0.5 to about 5 moles, preferably from about 1.5 to about 3 moles, of hydrogen are provided per mole of hydrocarbon in the reactant gas, although by the use of a special technique more fully referred to hereinafter the amount of hydrogen may be reduced to as low as about 0.1 mole of hydrogen per mole of hydrocarbon reactant.

The temperature to which the reactant gas is preheated prior to its admixture with the hydrogen-containing gas is such that the temperature attained in the exothermic acetylene-producing reaction which takes place upon said admixing is between about 1100° C. and about 1500° C., preferably between about 1275° C. and about 1375° C. It is a unique characteristic of the process that the reactant gas can be preheated to relatively high temperatures, e. g., 600°–1150° C., in the absence of hydrogen without reaction occurring to any substantial extent, but when the reactant gas is admixed with hydrogen at such temperatures an exothermic acetylene-producing reaction takes place spontaneously and without the addition of any further substantial quantity of heat. As a result of such reaction occurring, the temperature of the reacting gas rises very rapidly to much higher values. Maximum yields of acetylene are obtained when such reaction temperature is between about 1100° C. and about 1500° C. The temperature to which the reactant gas must be preheated to secure a reaction temperature within this range depends upon a number of factors, including the composition of the reactant gas, the period of time in which the preheating is effected, and the amount of turbulent mixing of the reactant gas components which may take place during the preheating. All of these factors are variables which contribute to the possibility of reaction occurring between the reactant gas components during the preheating in the absence of added hydrogen. Inasmuch as it is desirable to avoid such reaction, these variables should be so controlled that the preheat temperature is not attain the desired subsequent reaction temperature is not so high that reaction between the components of the reactant gas takes place to any substantial extent during the preheating. With reactant gas mixtures of the composition previously given it is usually desirable to preheat as rapidly as possible, e. g., in from about 0.005 to about 0.5 second, and to avoid obstructed flow that would increase turbulent mixing during the preheating. Thus, it is usually desirable to combine the components of the reactant gas prior to preheating the same, and to pass the mixture through the preheating zone at a relatively high velocity. Under ordinary conditions of operation the preheat temperature will be between about 600° C. and about 1150° C. and the preheat time will be between about 0.005 and about 0.1 second.

The reaction time, i. e., the time interval between admixture of the preheated reactant gas with the hydrogen-containing gas and the cooling of the product gas to a temperature at which substantially no further reaction occurs, varies inversely with the reaction temperature. Shorter reaction times are employed at the higher reaction temperatures, and vice versa. Such time is between about 0.001 and about 0.05 second, preferably between about 0.002 and about 0.02 second, and is readily controlled by varying the rate at which the gases are introduced into and are withdrawn from the reaction zone. The maximum temperature at which substantially no further reaction takes place depends somewhat upon the composition of the reactant gas, but is ordinarily about 600°–650° C. However, since as much as possible of the sensible heat of the product gas should be conserved for use in the subsequent steam generation step, the product gas should not be cooled any more than is necessary to arrest the reaction within the stated period of time. Thus, the temperature to which the product gas is cooled should be below, but not greatly below, the maximum temperature at which substantially no further reaction takes place. Stated alternatively, the product gas should be cooled to a temperature at which substantially no further reaction occurs but which is substantially above the boiling point of water. Such temperature is preferably between about 500° C. and about 600° C., but may be considerably lower, e. g., 200°–500° C.

The reaction step may be effected in a variety of ways, but in essence consists in passing the reactant gas through a preheating zone wherein it is preheated to the requisite preheat temperature, thence through a reaction zone wherein it is admixed with the hydrogen-containing gas and the exothermic acetylene-producing reaction takes place, and thence through a quenching zone wherein the hot gas is cooled as above described. In the reactor illustrated in Figure 1 the extent of these zones is designated, and only one set of such zones is provided. It will be apparent, however, that a plurality of such zones may be provided within a single reaction vessel. Alternatively, a plurality of preheating zones may be arranged to feed into a common reaction zone which in turn feeds into a common quenching zone. If desired, a reactor of the type described in the copending application of William Smith Dorsey, Serial No. 217,633, filed March 26, 1951, may be employed. Such reactor comprises a plurality of parallel sets of preheating, reaction and quenching zones arranged in inverse order so that each preheating zone is adjacent to and in heat exchange relationship with a quenching zone, and each reaction zone is adjacent to and in heat exchange relationship with another reaction zone. Such type of reactor has extremely high thermal efficiency, and may even be operated autothermically since the heat removed by quenching is employed for preheating the reactant gas. Alternatively, a reactor of the type described in the co-pending application of William Smith Dorsey, Serial No. 219,936, filed April 9, 1951, now United States Patent No. 2,679,542, may be employed. Such reactor provides for introduction of a plurality of streams of preheated reactant gas into the central portion of an elongated reaction zone, and for introduction of the hydrogen-containing gas adjacent the walls of the reaction zone so that a film of hydrogen is interposed between said walls and the reactant gas. Such reactor permits a very substantial reduction in the amount of hydrogen required. Other means of effecting the herein described reaction step will be apparent to those skilled in the art, and any suitable engineering technique may be applied thereto.

THE STEAM GENERATION STEP

Immediately following the reaction step described above, the product gas which is obtained therefrom at an elevated temperature preferably between about 500° C. and about 600° C. is passed to a steam generation step wherein it is further cooled and its sensible heat is utilized for the production of steam employed in the subsequent hydrogen-producing step. This operation is suitably carried out in a conventional waste heat boiler through which the product gas is passed in indirect heat exchange relationship with water. Various types of equipment are suitable for such operation, and the design and construction of such equipment according to the temperatures, flow rates, materials of construction, etc., are well understood in the chemical engineering art. In accordance with customary practice, the boiler feed water may be preheated either from an auxiliary source of heat or from a source of waste heat, as for example the hot flue gases from the acetylene reactor or the hot gases produced in the hydrogen-producing operation. The essence of the steam generation step lies in utilizing the sensible heat of the product gas to produce at least a substantial part of the steam consumed in the hydrogen-producing step, and any of the conventional means for this type of operation may be employed in its accomplishment.

THE ACETYLENE SEPARATION STEP

The acetylene-containing product gas is usually withdrawn from the steam generation step at a temperature somewhat above 100° C. and at substantially atmospheric pressure, and is saturated with water vapor. In order to remove the water and thereby simplify the acetylene recovery operation, the gas is usually cooled to below about 100° C., e. g. 50–90° C., and is passed to a gas-liquid separator for separation of the condensate. As hereinbefore set forth, the dry gas comprises acetylene, nitrogen, hydrogen, unreacted hydrocarbon, and small amounts of carbon oxides and hydrocarbon by-products. Separation of the acetylene from such mixture may be accomplished in various ways, selective solvent extraction and selective adsorption on solid adsorbents being particularly suitable. Thus, the gas mixture may be countercurrently contacted with an acetylene solvent in a conventional absorption tower which may be of the packed or bubble-cap type, whereby the acetylene is selectively dissolved in the solvent and the remaining components of the gas mixture are removed from the tower and passed to the hydrogen-producing operation. The acetylene-rich solvent is passed to a rectification column where the acetylene is distilled off and recovered in substantially pure form as the primary product of the process. The lean solvent is then recycled to the extraction tower for re-use in extracting the acetylene from a further quantity of gas. A number of solvents are satisfactory for use in recovering the acetylene in this manner, e. g., acetone, dimethyl formamide, acetonitrile, nitrobenzene, chlorinated hydrocarbons, and various polyglycols and their esters. Solvents having high solvent power for acetylene combined with low vapor pressure are the most satisfactory. As will be apparent to those skilled in the art, various other conventional solvent extraction procedures may be adapted and applied to the present recovery operation.

A particularly advantageous method for recovering the acetylene from the product gas comprises selectively adsorbing the acetylene on a moving bed of activated charcoal or other suitable solid adsorbent. Such operation may be carried out by the known "Hypersorption" technique, whereby the acetylene-containing product gas is passed upwardly through a bed of solid adsorbent which descends by gravity through a suitable tower under such conditions that the acetylene is preferentially adsorbed. The non-adsorbed gas passes from the top of the tower, and the acetylene-rich adsorbent passes through a stripping zone where the acetylene is desorbed therefrom by steam stripping or heating. The steam is separated from the acetylene product by condensation, and the adsorbent is cooled and returned to the top of the tower for re-use in adsorbing further quantities of acetylene from the feed gas. When the hydrocarbon reactant is low-cost methane or natural gas, it is usually of no great economic advantage to process the product gas for separation of the methane or natural gas for re-use in the reaction step. If desired, however, through the use of special techniques familiar to those skilled in the adsorption art, it is possible to operate the process to obtain a side-cut product comprising the unreacted hydrocarbon which may be recycled to the reaction step. Other techniques for effecting gas separation on solid adsorbents may be adapted to the present operation, and the fact that the acetylene is in admixture with a relatively large quantity of inert nitrogen is of definite advantage where the adsorption is carried out under increased pressure.

Separation of the acetylene from the product gas may also be effected by other means, such as absorption in aqueous solutions of certain metallic salts, low temperature fractionation, selective chemical reaction, etc.

THE HYDROGEN-PRODUCING STEP

As previously stated, the hydrogen-producing step is based on the reversible reaction between steam and iron or a lower oxide of iron to form hydrogen and a higher oxide of iron. The reactions may be written:

$$Fe + H_2O \rightleftharpoons FeO + H_2$$
$$3FeO + H_2O \rightleftharpoons Fe_3O_4 + H_2$$

The process based on these reactions is a cyclic one essentially comprising a steaming cycle to effect left-to-right hydrogen-producing reaction, followed by a reduction cycle to effect the right-to-left reaction whereby the iron oxide is reduced back to iron or a lower oxide of iron. As ordinarily practiced, the reduction cycle is carried out employing a substantially equimolecular mixture of carbon monoxide and hydrogen, i. e., water gas, as the reducing agent. I have found, however, that the acetylene-free product gas obtained from the hereinabove described acetylene process is highly satisfactory for use in effecting the reduction. Such gas approximately comprises:

| | Percent by volume |
|---|---|
| Hydrogen | 40–45. |
| Nitrogen | 40–45. |
| Carbon monoxide | 5.5–6.5. |
| Methane | 5.0–6.0. |
| Carbon dioxide | Less than 1. |
| Ethylene | Less than 1. |

The large amount of inert nitrogen and smaller amounts of hydrocarbons and carbon dioxide do not interfere with the reduction reaction, and the carbon monoxide is itself a reducing agent and assists in effecting the reduction.

Theoretically, the hydrogen-production process can be carried out without the consumption of heat since the exothermic heat of hydrogen-producing reaction is equivalent to the endothermic heat of the reduction reaction. In practice, however, heat must be supplied to the system to make up for losses. This is accomplished by employing an excess of the reducing gas and burning such excess within the reactor to supply the required heat. In the present process, the quantity and composition of the acetylene-free product gas obtained from the acetylene separation step is such that only about one-half of the available hydrogen is consumed in reducing the iron oxide, and the remainder is sufficient, when burned, to supply the necessary heat. In general, the hydrogen-producing step of the present process differs from the widely practiced commercial production of hydrogen by the steam-iron process only in the nature of the reducing gas employed, and the use of such gas instead of the customary water gas necessitates no material changes in either the equipment design, operating techniques or conditions.

Any of the various types of commercially available steam-iron hydrogen generators may be employed in the present process. For the most part the essential difference between these types lies in the method provided for supplying heat to the system. The single-retort reactor known as the "Bamag Generator" is preferred in the present process, although other types of single-retort reactors and the multi-retort Lane-type reactor are also suitable. Most of such reactors are provided with means whereby the steam is superheated by indirect heat exchange with the hot hydrogen-containing product gas.

Various types of iron or iron oxide may be employed as the contact mass, but in general relatively low grade natural iron ores have been found to give the most satisfactory results. Any of the ores or other forms of iron employed in conventional hydrogen generators may be employed in the present process, and in accordance with customary procedure it is preferred to use an ore having a spathic structure. The contact mass may also comprise metals or metal oxides other than iron or iron oxide which are capable of reducing steam. In the appended claims the term "iron in a steam-reducing state of oxidation" is employed as a generic expression to include metallic iron as well as the lower oxides of iron capable of reducing steam to hydrogen at elevated temperatures.

While the hydrogen-producing operation essentially comprises the two cycles previously mentioned, as practiced commercially it almost invariably includes a so-called "purge" cycle and may also include a blowing cycle. The purging cycle essentially consists in passing a current of steam, which has preferably been superheated to a temperature of about 150°–450° C., through the iron mass while maintaining a temperature of about 600°–700° C. The hydrogen product is continuously withdrawn and passed to scrubbing and/or storage means. The blowing cycle, when employed, follows the steaming cycle, and consists in blowing air through the mass for a few minutes for the purpose of removing impurities, e. g., carbon, sulfur compounds, etc. Usually, the air is passed through the mass in the same direction as the steam. The reduction cycle follows the blowing cycle, and consists essentially in passing the reducing gas through the mass in a direction opposite to that in which the steam is passed. As previously stated, the reduction reaction is endothermic and the heat necessary to maintain the operating temperature is supplied by burning the excess reducing gas within the reactor. In certain types of reactors the hot exhaust gas is passed over a refractory checker-work through which the steam is passed during the next succeeding steaming cycle, whereby the steam is superheated. The purge cycle follows the reduction cycle and consists in passing steam through the mass for a short period of time just prior to the steaming cycle. Since the purge gases are burned within the reactor or otherwise disposed of, the purge cycle in effect amounts merely to the discarding of a small fore-run of the hydrogen product. The timing of the various cycles depends somewhat upon the capacity of the reactor and the temperature at which the operation is carried out. Most commercial reactors operate on a 10-minute steaming cycle, a 10- to 40-second blowing cycle, a 20-minute reduction cycle, and a 1- to 5-minute purge cycle. As will be apparent to those skilled in the art, a number of reactors may be coupled with interlocking valves so that a continuous production of hydrogen is attained. In most instances a battery of reactors or generators feed into a common purification system wherein the hydrogen product is cooled and scrubbed to remove impurities. The hydrogen is then passed to gas storage means from whence it is drawn for return to the acetylene-production step.

The following example will illustrate practice of the process of the invention, but is not to be construed as limiting the same:

*Example*

The acetylene reactor employed is similar to that illustrated in the accompanying drawing, except that the preheating zone comprises six separate tubes arranged in a circular pattern exposed directly to the burners of the furnace. The feed gas is introduced into four of such tubes and hydrogen is introduced into the remaining two. Within the furnace the preheating tubes terminate in a single large tube which constitutes the reaction zone. The length of the preheating zone is 34 inches and the water quench is positioned so that the length of the reaction zone is 27.5 inches. Reaction conditions are as follows:

| | |
|---|---|
| Feed gas: | |
| Air | 75.0% by vol. |
| Natural gas | 25.0% by vol. |
| Feed gas rate | 577 SCFH. |
| Hydrogen rate | 220 SCFH. |
| Ratio, hydrogen/natural gas | 1.57/1 |
| Preheat temperature | 980° C. |
| Preheat time | 0.009 sec. |
| Reaction temperature | 1300° C. |
| Reaction time | 0.0023 sec. |

The product gas is obtained at a rate of about 800 SCFH, and on a water-free basis comprises:

| | Per cent by vol. |
|---|---|
| Acetylene | 3.7 |
| Carbon monoxide | 7.7 |
| Carbon dioxide | 1.1 |
| Hydrogen | 34.3 |
| Oxygen | 0.1 |
| Methane | 3.2 |
| Ethylene | 0.2 |
| Nitrogen | 49.7 |
| | 100.0 |

The yield of acetylene is about 37 per cent based on the amount of hydrocarbon employed, and about 45 per cent based on the amount of hydrocarbon consumed.

The quenched product gas is taken from the reactor at a temperature of about 525° C. and is passed through a waste heat boiler wherein it is cooled to about 90° C. and produces about 33 pounds of steam. Such quantity of steam is sufficient to produce about 225 SCFH of hydrogen in a commercial steam-iron hydrogen generator operating at average efficiency. The cooled product gas is passed to a solvent extraction system where it is countercurrently contacted with dimethyl formamide. The rich solvent is then heated to drive off the dissolved acetylene, which is recovered in a purity of about 98 per cent.

The non-absorbed gas is obtained from the dimethyl formamide extraction at a rate of about 750 SCFH, and is employed as the reducing gas in a commercial steam-iron hydrogen generator. At a temperature of about 860° C., approximately 47 per cent of the hydrogen and carbon monoxide is consumed in reducing the spathic iron ore with which the generator is filled. The remainder of the gas has sufficient heating value to supply the heat necessary to maintain the required temperature. Upon subsequent steaming of the reduced iron ore mass, sufficient hydrogen in a purity of about 98.7 per cent is generated for effecting another cycle of operation.

Other modes of applying the principle of my invention may be employed instead of those explained, change being made as regards the apparatus or materials employed provided the step or steps stated by any of the following claims, or the equivalent of such stated step or steps be employed.

I, therefore, particularly point out and distinctly claim as my invention.

1. The process for producing acetylene which comprises (1) preheating a reactant gas consisting essentially of oxygen and a non-aromatic hydrocarbon having a normal boiling point below about 400° C. to a temperature below that at which reaction between the components thereof takes place to any substantial extent; (2) initiating an acetylene-producing reaction by introducing into the preheated reactant gas a hydrogen-containing gas at a temperature below that at which any substantial amount of atomic hydrogen is formed, said hydrogen-containing gas being provided in a amount sufficient to provide between about 0.5 and about 5 moles of hydrogen per mole of said hydrocarbon; (3) controlling the temperatures of said preheated reactant gas and said hydrogen-containing gas so that the temperature attained in said acetylene-producing reaction is between about 1100° C. and about 1500° C.; (4) within from about 0.001 to about 0.05 second after introduction of the said hydrogen-containing gas into the said preheated reactant gas, cooling the product gas to a temperature substantially above the boiling point of water but at which substantially no further reaction occurs; (5) passing the cooled product gas in indirect heat exchange relationship with water to generate steam and further cool the product gas; (6) passing said steam in contact with a material selected from the class consisting of metals and metal oxides capable of reducing steam and maintained at a steam-reducing temperature to form a hydrogen-containing gas and a higher metal oxide; (7) returning the hydrogen-containing gas so formed to the aforesaid step 2; (8) separating acetylene from the cooled product gas; and (9) passing the acetylene-free product gas in contact with said higher metal oxide at a reducing temperature to reduce said metal oxide to a lower steam-reducing state of oxidation.

2. The process of claim 1 wherein the hydrocarbon component of the reactant gas is a normally gaseous saturated aliphatic hydrocarbon.

3. The process of claim 1 wherein the reactant gas comprises between about 17 and about 30 per cent by volume of a hydrocarbon selected from the class consisting of natural gas and methane and from about 83 to about 70 per cent by volume of air.

4. The process for the production of acetylene which comprises (1) preheating a reactant gas comprising a normally gaseous saturated aliphatic hydrocarbon and oxygen in a mole ratio of hydrocarbon to oxygen between about 1.33/1 and about 2.0/1 in the substantial absence of free hydrogen to a temperature between about 600° C. and about 1150° C. such that substantially no reaction occurs between the components of said reactant gas; (2) initiating an acetylene-producing reaction by introducing into the preheated reactant gas a hydrogen-containing gas comprising between about 30 and 100 per cent by volume of molecular hydrogen and between about 70 and zero per cent by volume of a diluent gas which is inert under the conditions of said acetylene-producing reaction, said hydrogen-containing gas being at a temperature below that at which any substantial amount of atomic hydrogen is formed, and being provided in an amount sufficient to provide between about 0.5 and about 5 moles of hydrogen per mole of said hydrocarbon; (3) controlling the temperatures of said preheated reactant gas and said hydrogen-containing gas so that the temperature attained in said acetylene-producing reaction is between about 1100° C. and about 1500° C.; (4) within from about 0.001 and about 0.05 second after introduction of the said hydrogen-containing gas into the said preheated reactant gas, cooling the product gas to a temperature substantially above the boiling point of water but at which substantially no further reaction occurs; (5) passing the cooled product gas in indirect heat exchange relationship with water to generate steam and further cool the product gas; (6) passing said steam in contact with iron in a steam-reducing state of oxidation maintained at a steam-reducing temperature to form a hydrogen-containing gas of the aforesaid composition and a higher oxide of iron; (7) returning the hydrogen-containing gas so formed to the aforesaid step 2; (8) separating acetylene from the cooled product gas; and (9) passing the acetylene-free product gas in contact with said higher oxide of iron at a reducing temperature to reduce said higher oxide of iron to a lower steam-reducing state of oxidation.

5. The process of claim 4 wherein the product gas is cooled to a temperature between about 200° C. and about 600° C. in step 4.

6. The process of claim 4 wherein the hydrocarbon component of the reactant gas is selected from the class consisting of methane and natural gas.

7. The process of claim 4 wherein the reactant gas comprises between about 17 and about 30 per cent by volume of natural gas and between about 83 and about 70 per cent by volume of air.

8. The process of claim 4 wherein the amount of hydrogen admixed with the preheated reactant gas is sufficient to provide between about 1.5 to about 3 moles of hydrogen per mole of the hydrocarbon component of the reactant gas.

9. The process of claim 4 wherein the hydrogen is preheated to substantially the same temperature as the preheated reactant gas prior to its admixture therewith.

10. The process for producing acetylene which comprises (1) preheating a reactant gas comprising between about 17 and about 30 per cent by volume of a hydrocarbon selected from the class consisting of methane and natural gas and between about 83 and about 70 per cent by volume of air in the substantial absence of the free hydrogen to a temperature between about 600° C. and about 1500° C. such that substantially no reaction occurs between the components of said reactant gas; (2) initiating an acetylene-producing reaction by introducing into the preheated reactant gas sufficient of a hydrogen-containing gas comprising between about 30 and 100 per cent by volume of molecular hydrogen and between about 70 and zero per cent by volume of a diluent gas which is inert under the conditions of said acetylene-producing reaction to provide between about 1.5 and about 3 moles of hydrogen per mole of the hydrocarbon component of said reactant gas, said hydrogen-containing gas being at a temperature below that at which any substantial amount of atomic hydrogen is formed; (3) controlling the temperatures of said preheated reactant gas and said hydrogen-containing gas so that the temperature attained in said acetylene-producing reaction is between about 1100° C. and about 1500° C.; (4) within from about 0.001 and about 0.05 second after introduction of the said hydrogen-containing gas into the said preheated reactant gas, cooling the product gas to a temperature between about 200° C. and about 600° C.; (5) passing the cooled product gas in indirect heat exchange relationship with water to generate steam and further cool the product gas; (6) passing said steam in contact with iron in a steam-reducing state of oxidation maintained at a steam-reducing temperature to form a hydrogen-containing gas of the aforesaid composition and a higher oxide of iron; (7) returning the hydrogen-containing gas so formed to the aforesaid step 2; (8) separating acetylene from the cooled product gas; and (9) passing the acetylene-free product gas in contact with said higher oxide of iron at a reducing temperature to reduce said higher oxide of iron to a lower steam-reducing state of oxidation.

11. The process of claim 10 wherein the acetylene is separated from the cooled product gas by selective solvent extraction.

12. The process of claim 10 wherein the hydrogen is preheated to substantially the same temperature as the preheated reactant gas prior to its admixture therewith.

13. In a process wherein a preheated reactant gas comprising a normally gaseous saturated aliphatic hydrocarbon and oxygen is preheated in the substantial absence of free hydrogen and is thereafter admixed with between about 0.1 and about 5 mols of hydrogen per mole of said hydrocarbon to induce an exothermic acetylene-producing reaction occurring at a temperature between about 1100° C. and about 1500° C., and the hot product gas is quenched to a temperature between about 200° C. and about 600° C. within from about 0.001 to about 0.05 second after admixing of the hydrogen with the preheated reactant gas, the improvement which consists in utilizing the sensible heat of the quenched product gas to generate steam, passing said steam in contact with iron in a steam-reducing state of oxidation at a steam-reducing temperature whereby hydrogen and a higher oxide of iron are formed, separating acetylene from the product gas, and passing the acetylene-free product gas in contact with said higher oxide of iron at a reducing temperature whereby said higher oxide of iron is reduced to a lower steam-reducing state of oxidation.

References Cited in the file of this patent

UNITED STATES PATENTS

| | | |
|---|---|---|
| 2,167,471 | Auerbach | July 25, 1939 |
| 2,449,635 | Barr | Sept. 21, 1948 |
| 2,549,240 | Robinson | Apr. 17, 1951 |

FOREIGN PATENTS

| | | |
|---|---|---|
| 332,731 | Great Britain | July 31, 1930 |
| 479,438 | Great Britain | Feb. 4, 1938 |